J. A. OLBON.
AUTOMOBILE LOCK.
APPLICATION FILED OCT. 28, 1919. RENEWED SEPT. 30, 1920.
1,360,673.
Patented Nov. 30, 1920.
3 SHEETS—SHEET 1.
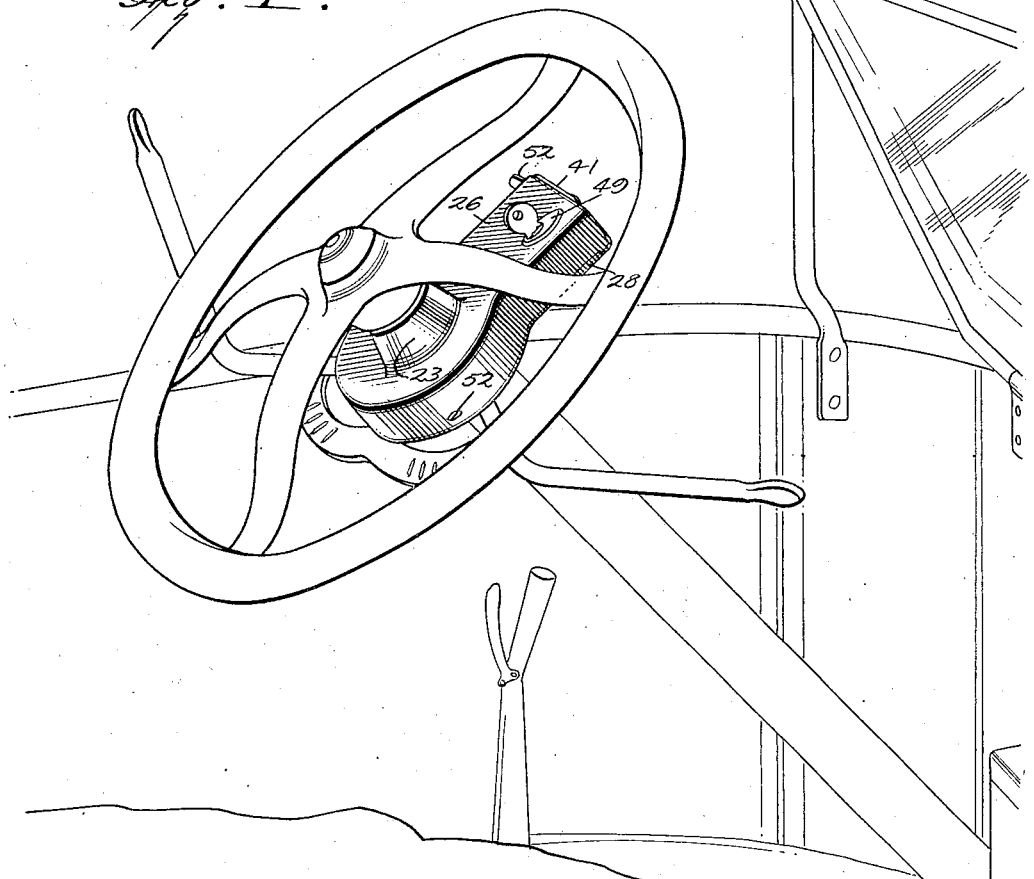
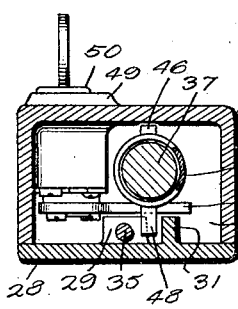
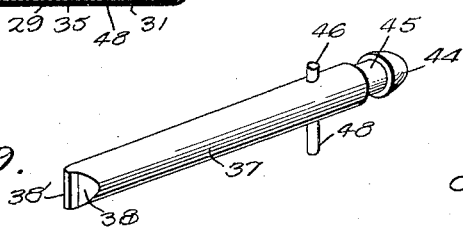
Inventor
JOHN A. OLBON,
By C. N. Parker
Attorney J. A. OLBON.
AUTOMOBILE LOCK.
APPLICATION FILED OCT. 28, 1919. RENEWED SEPT. 30, 1920.
1,360,673.
Patented Nov. 30, 1920.
3 SHEETS—SHEET 2.
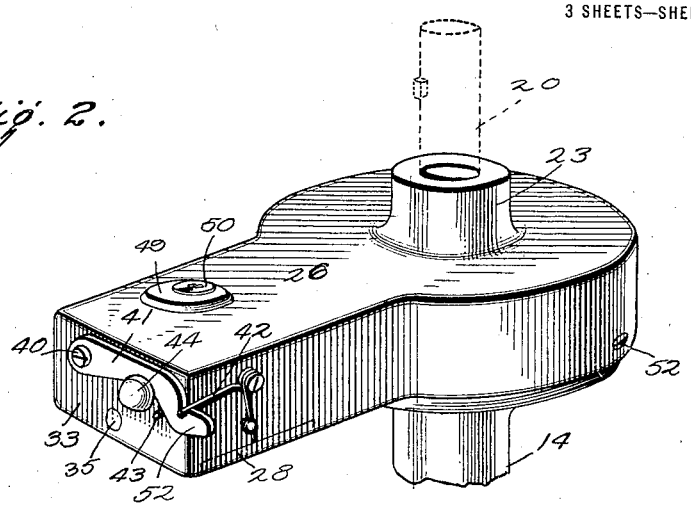
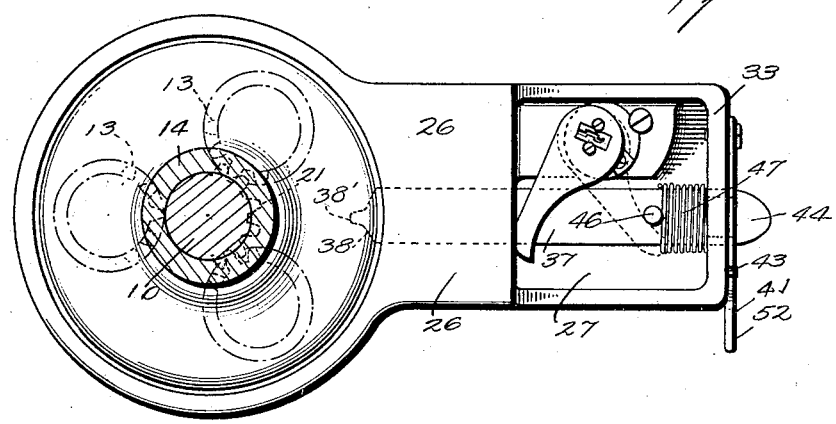
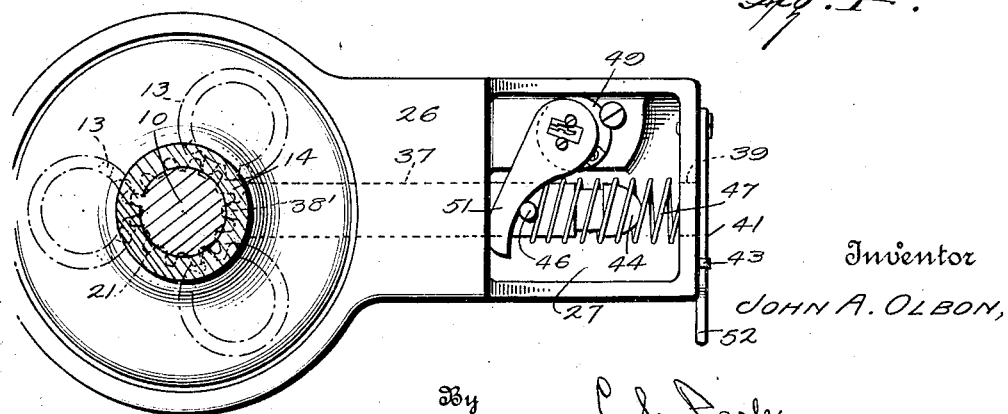
Inventor
JOHN A. OLBON,
By Ch. Parker
Attorney J. A. OLBON.
AUTOMOBILE LOCK.
APPLICATION FILED OCT. 28, 1919. RENEWED SEPT. 30, 1920.
1,360,673.
Patented Nov. 30, 1920.
3 SHEETS—SHEET 3.
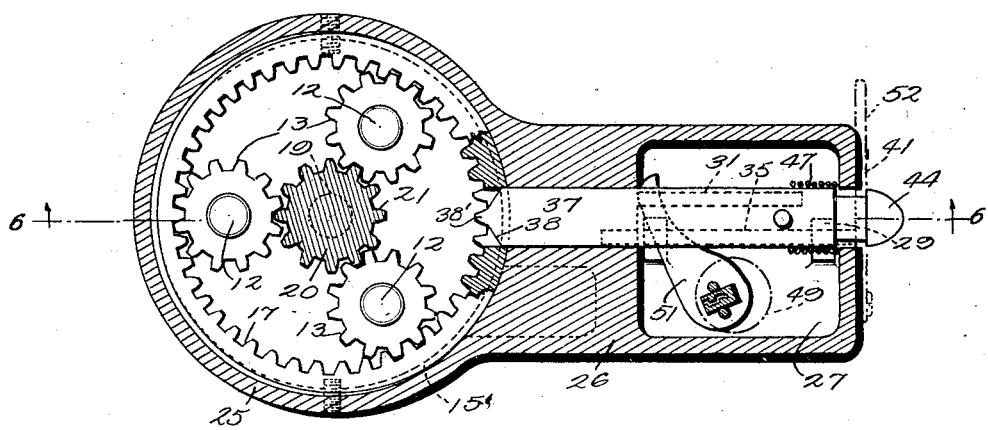
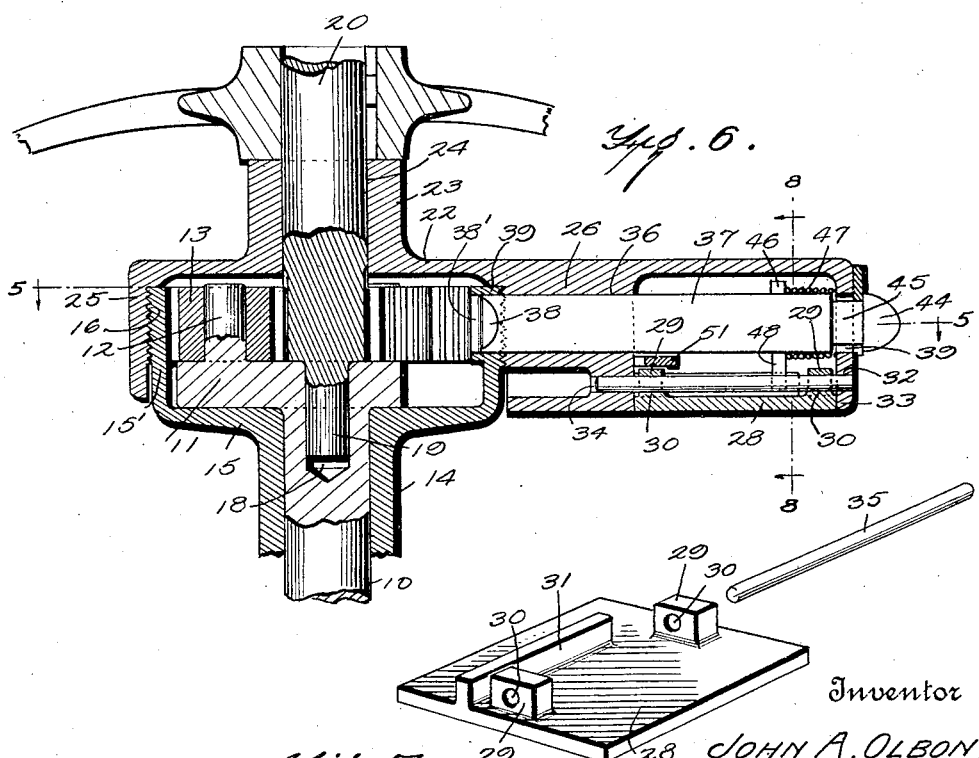
Inventor
JOHN A. OLBON,
By Ch. Parkin
Attorney

UNITED STATES PATENT OFFICE.

JOHN A. OLBON, OF PATERSON, NEW JERSEY, ASSIGNOR TO AUTO SAFETY DEVICE COMPANY, OF TOWN OF UNION, NEW JERSEY, A CORPORATION OF NEW JERSEY.

AUTOMOBILE-LOCK.

1,360,673.

Specification of Letters Patent.   Patented Nov. 30, 1920.

Application filed October 28, 1919, Serial No. 334,065. Renewed September 30, 1920. Serial No. 413,897.

*To all whom it may concern:*

Be it known that I, JOHN A. OLBON, a citizen of the United States, residing at Paterson, in the county of Passaic and State of New Jersey, have invented certain new and useful Improvements in Automobile-Locks, of which the following is a specification.

This invention relates to automobile locks.

An important object of the invention is to provide a lock for use upon machines wherein the steering post is shifted by the steering wheel through medium of a planetary gear train similar to that now in use upon Ford automobiles.

A further object of the device is to provide a lock wherein the bolt when withdrawn by the key is automatically locked in withdrawn position and wherein when it is desired to lock the steering post, the use of the key is not necessary, but simply the shifting of the latch which holds the bolt in withdrawn position. This latter feature of the lock eliminates to a great extent liability of the owner of the machine leaving the key in the lock after locking the same, and the feature of locking the bolt in withdrawn position prevents accidental locking of the steering post during travel of the machine.

Other objects and advantages will be apparent throughout the course of the following description.

In the accompanying drawings wherein for the purpose of illustration is shown a preferred embodiment of my device and wherein like numerals designate like parts throughout,—

Figure 1 is a perspective view of the interior of a Ford automobile showing my lock in position upon the steering gear thereof.

Fig. 2 is a perspective of the lock taken from the opposite side and somewhat enlarged.

Fig. 3 is a bottom plan view showing the bolt in the withdrawn or inoperative position.

Fig. 4 is a view similar to that shown in Fig. 3, the bolt being in the locking position.

Fig. 5 is a section taken on the line 5—5 of Fig. 6.

Fig. 6 is a section taken on the line 6—6 of Fig. 5.

Fig. 7 is a detached perspective of the removable bottom plate and the pin which holds the plate in an assembled position.

Fig. 8 is a section taken on the line 8—8 of Fig. 6, and

Fig. 9 is a perspective of the locking bolt detached.

Referring now more particularly to the drawings, the numeral 10 indicates the steering post of an automobile provided upon its upper end with a horizontal flange 11, having formed thereon vertical pivots 12. Mounted upon these pivots, which are three in number, are pinions 13.

The steering post 10 is surrounded by a casing 14 provided upon its upper end with horizontal flange 15, the upper surface of which is adapted to slidably receive the horizontal flange 11 of the steering post 10. The horizontal flange 15 of the casing 14 is provided with a vertical annular flange 15', having screw threads 16 formed upon the exterior thereof. The interior of the flange 15' is provided with an internal gear 17 formed integrally with the flange.

The upper end of the steering post 10 is provided with a vertically central bore 18 adapted to receive the reduced lower end 19 of a stub shaft 20 to the upper end of which is secured the steering wheel. The lower end of the stub shaft 20 is provided externally with gear teeth 21, which mesh with the pinions 13. As these pinions also mesh with the internal gear 17, it will be seen that rotation of the stub shaft 20 through medium of the steering wheel transmits a reduced rotation to the steering post 10.

A casing 22 is provided having an upstanding portion 23 provided with central bore 24 adapted to rotatably receive the stub shaft 20. This casing is provided with depending flange 25, having internal screw threads 16 adapted to receive external screw threads arranged on the annular flange 15.

The casing 22 is provided with a horizontally extending portion 26 having formed therein a recess 27, opening through the bottom of the extension. A plate 28 is provided to close the opening of the recess 27 having upstanding lugs 29 formed upon its upper surface. These lugs are provided with alined openings 30. A longitudinal rib 31 is provided upon the upper surface of the plate 28 and this rib is parallel to the center line of the openings 30. The horizontal extension 26 is provided with an opening 32 in the rear wall 33 thereof. An opening 34 is also provided in casing 26, alined with the opening 32. The openings 30, 32, and 34 co-act to receive a pin 35, which holds the plate 28 in position in the bottom of the recess 27.

The horizontal portion 26 is provided with bore 36 adapted to slidably receive a locking bolt 37. The forward end of the locking bolt 38 extends into a bore 39 formed in the annular flange 15'. This bore extends through the internal gear 17. It will be obvious that the bolt receiving aperture destroys a portion of the teeth of the internal gear 17. The forward end 38 of the bolt 37 is accordingly provided with a gear tooth 38' to replace the tooth destroyed by the formation of the bore.

The rear wall 33 of the extension 26 is provided with aperture 39 alined with the bore 36, which is adapted to receive the rear end of the bolt 37 when in the withdrawn position. Pivoted to the rear wall 33 as at 40 is a latch 41. A spring 42 is provided having one end secured to the horizontal extension 26 in any suitable manner and the other end engaging the latch 41 and forcing it into engagement with a stop pin 43. This latch normally covers a portion of the opening 39. The rear end of the bolt 37 is provided with a cam face 44 adapted to engage the latch and shift it to allow passage of the bolt through the opening and the bolt is provided adjacent such end with annular groove 45, adpted to receive the latch when the bolt arrives at the extreme rearmost position.

The bolt 37 is provided with transverse pin 46. A compression spring 47 surrounds the bolt 37 and extends intermediate the transverse pin 46 and the end wall 33 of the extension 26 normally projecting the bolt for engagement with the gear teeth 21 of the stub shaft 20, as shown in Fig. 4. The lower end 48 of the transverse pin has its extremity arranged between the rib 31 and pin 35. It will be seen that the rib 31 and pin 35 co-act to hold the tooth 38' of the bolt in the proper alinement.

Mounted in the extension 26 is a lock member 49, having a rotatable key operated portion 50. Secured to the inner end of the rotatable key operated portion is a finger 51, adapted to engage the pin 46 and force the bolt rearwardly into the inoperative position.

By inspection of Figs. 3, 5, and 6, it will be obvious that the tooth 38' of the bolt 37, when the bolt is in withdrawn position, acts as a portion of the internal gear 17 and that, when in the locking position, the tooth 38' engages the external gear teeth 21 of the stub shaft 20, locking the stub shaft and steering wheel, allowing no play of the wheel whatsoever. Furthermore, the forward end of the bolt extending through the aperture 39 effectually locks the casing 22 to the flange 15' and the casing may not be rotated until the bolt 37 is entirely withdrawn. This is only possible by removal of the bottom plate 28, affording access to the pin 46 and subsequent removal of the pin 46. As an additional precaution, set screws 52 extending through the flange 25 and engaging the flange 15' are provided.

It will be obvious that many changes may be made in the shape, size, and arrangement of the various parts herein shown and I accordingly do not limit myself to the specific structure described, but may make any such changes without departing from the spirit of the invention or the scope of the subjoined claims.

What I claim is:

1. The combination with a steering gear embodying a planetary gear train, said gear train embodying a central rotatable gear, an internal gear fixed against rotation, and a pinion engaging said rotatable gear and said internal gear, of a laterally movable locking bolt provided upon its inner end with a gear tooth forming a portion of said internal gear when the bolt is in withdrawn position, means normally projecting said bolt to bring the gear tooth thereof into engagement with said rotatable gear and means for withdrawing said bolt.

2. The combination with a steering gear embodying a planetary gear train, said gear train embodying a central rotatable gear, an internal gear fixed against rotation, and a pinion engaging said rotatable gear and said internal gear, of a laterally movable locking bolt provided upon its inner end with a gear tooth forming a portion of said internal gear when the bolt is in withdrawn position, means normally projecting said bolt to bring the gear tooth thereof into engagement with said rotatable gear, means for withdrawing said bolt, and releasable means for automatically locking said bolt in withdrawn position.

3. The combination with a steering gear embodying a planetary gear train comprising a central rotatable gear, an internal gear fixed against rotation and provided upon its exterior with screw threads, a pinion engaging said internal gear and said rotatable gear, of a casing provided with internal screw threads adapted to engage the screw threads of said internal gear, alined bores formed in said internal gear and casing, a laterally movable bolt arranged in said bores, said bolt being adapted when projected forwardly to engage said rotatable gear, means for projecting said bolt forwardly, and means for withdrawing said bolt.

4. The combination with a steering gear embodying a planetary gear train comprising a central rotatable gear, an internal gear fixed against rotation and provided upon its exterior with screw threads, a pinion engaging said internal gear and said rotatable gear, of a casing provided with internal screw threads adapted to engage the screw threads of said internal gear, alined bores formed in said internal gear and casing adapted to slidably receive a bolt, said bolt being adapted when projected forwardly to engage said rotatable gear, means for projecting said bolt forwardly, means for withdrawing said bolt, an aperture formed in the rear wall of said casing, an opening through which the rear end of said bolt extends when in the withdrawn position, a spring pressed latch normally partially covering said opening, a cam face formed upon the rear end of said bolt and adapted to shift the latch to allow passage of the body of the bolt, and an annular groove formed in said bolt adjacent the rear end thereof and adapted to receive said latch when the bolt is fully withdrawn.

5. The combination with a steering gear embodying a planetary gear train, comprising a central rotatable gear, an internal gear fixed against rotation, and a pinion engaging said internal gear and said rotatable gear, of a casing, alined bores formed in said internal gear and casing, adapted to slidably receive a bolt, said bolt being adapted when projected forwardly to engage said rotatable gear, means for projecting said bolt forwardly, means for withdrawing said bolt, an aperture formed in the rear wall of said casing, a spring pressed latch normally covering a portion of said aperture, a cam face formed upon the rear end of said bolt and adapted to shift the latch to allow passage of the bolt, the bolt being provided with an annular groove near its end, said groove being adapted to receive the latch when the bolt is fully withdrawn.

In testimony whereof I affix my signature in presence of two witnesses.

JOHN A. OLBON.

Witnesses:
J. N. McCauley,
Wm. G. Mille.